Figure 2:
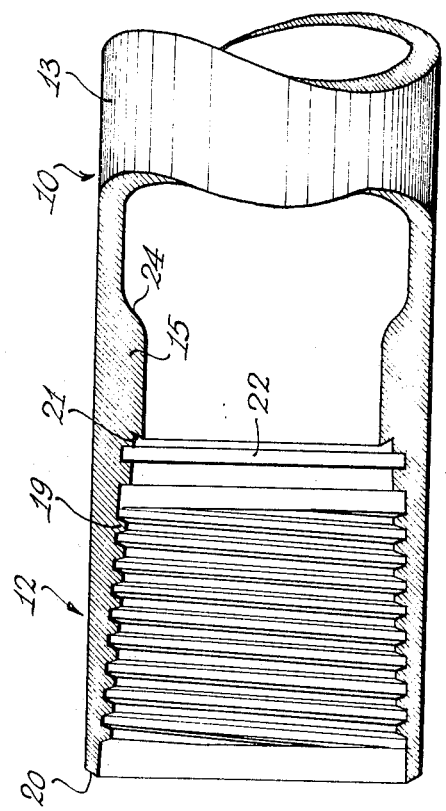

United States Patent
Hokanson

[15] 3,658,368
[45] Apr. 25, 1972

[54] DRILL ROD STRUCTURES

[72] Inventor: Lyle W. Hokanson, Kirkland Lake, Ontario, Canada

[73] Assignee: Heath & Sherwood Drilling Limited, Ontario, Canada

[22] Filed: June 1, 1970

[21] Appl. No.: 42,175

[52] U.S. Cl..............................................285/333, 285/355
[51] Int. Cl.............................................F16l 25/00
[58] Field of Search..................285/36, 333, 334, 355, 390

[56] References Cited

UNITED STATES PATENTS

| | | | |
|---|---|---|---|
| 1,932,427 | 10/1933 | Stone | 285/334 |
| 1,973,848 | 9/1934 | Duffy | 285/333 X |
| 2,150,221 | 3/1939 | Hinderliter | 285/333 X |
| 2,239,942 | 4/1941 | Stone et al. | 285/334 X |
| 3,067,593 | 12/1962 | McCool | 285/333 X |
| 3,100,656 | 8/1963 | MacArthur | 285/333 X |

FOREIGN PATENTS OR APPLICATIONS

| 865,883 | 2/1953 | Germany | 285/333 |

*Primary Examiner*—Andrew V. Kundrat
*Attorney*—Weir, Marshall, MacRae & Lamb

[57] ABSTRACT

A drill rod is provided which is adapted to have improved high joint pressure efficiency and high joint mechanical efficiency. The rod comprises a plurality of pipes each having an internally upset joint section at each end thereof. Each joint section has a threaded portion of tapering diameter and an annular shoulder at each end of the threaded portion. Each shoulder has an axially presented face disposed at an angle to a plane normal to the axis of the pipe.

1 Claims, 2 Drawing Figures

PATENTED APR 25 1972

3,658,368

INVENTOR
Lyle W. Hokanson
BY
Weir, Marshall, MacRae & Lamb
PATENT AGENT

DRILL ROD STRUCTURES

This invention relates to drill rod structures.

The stock wireline drill pipe with flush internal and external surfaces, as used in normal diamond drill operations, is not suitable in some fields of operation and particularly for oil and gas well drilling. Some disadvantages of conventional pipe for this purpose may be listed as follows, a. The joint mechanical efficiency of approximately 50 percent of pipe strength is not adequate to permit safe use in deep holes, say, of the order of 8,000 – 15,000 feet.

b. The joint pressure efficiency of approximately 30 percent of pipe burst strength is not adequate for safe use where high gas or oil pressures are encountered. Such high pressures are frequently encountered when holes are drilled in sedimentary rocks. These pressures, usually due to natural gas, are in excess of, and more dangerous, than those encountered in "hard" rocks. Moreover, it has been found that joint pressure efficiency decreases rapidly with use.

c. The joint connections tend to "bell out" when subjected to excessive torque.

d. The joints are vulnerable to vibrations.

e. The drill string as a whole lacks rigidity and resistance to wear.

The invention broadly comprises a drill pipe having an internally upset joint section at each end thereof. The joint section has a threaded portion of tapering diameter and an annular shoulder at each end of the threaded portion. Each shoulder has an axially presented face diaposed at an angle to a plane normal to the axis of the pipe for engagement with a complementary shoulder on an adjoining pipe.

Figure 1:
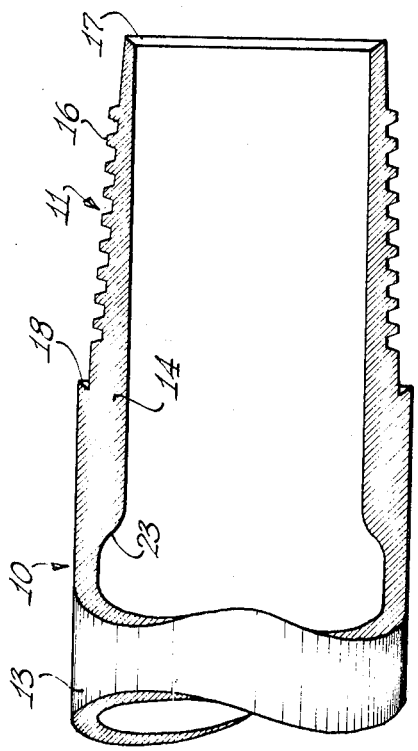

The invention will be described with reference to the accompanying drawing, in which FIG. 1 is a side elevation, partly in section of one end section of a drill pipe in accordance with the invention, and FIG. 2 is a side elevation, partly in section, of the other end section of a drill pipe.

The drill pipe 10 shown has a joint section 11 at one end, a joint section 12 at the other end, and a major intermediate section 13 which is of constant inside and outside diameter.

Each joint section is internally upset at 14 and 15, respectively.

Upset 14 has a tapered outside thread 16, and outer end annular shoulder 17, and an inner annular shoulder 18. The axially presented face of each shoulder is disposed at an angle to a plane normal to the axis of the pipe. A suitable angle is in the neighborhood of 30°.

Upset 15 has a tapered inside thread 19, an outer end annular shoulder 20, and an inner annular shoulder 21.

Shoulders 17, 18, 20, 21 are in parallel relation. Moreover, threads 16 and 19 are complementary so that, on threaded engagement of two similar drill pipes, shoulder 17 will abut shoulder 21, and shoulder 18 will abut shoulder 20. Preferably, joint section 12 has an inside annular groove 22 adjacent shoulder 21 for reception of sealing means such as an O-ring.

It will be observed that the inner wall of each upset portion is parallel to the outer wall of the pipe. Preferably, the inner end of each upset merges gradually into the inside wall of the pipe in a generally curved contour as indicated at 23, 24. The inner wall contour of each upset as described, facilitates movement of the core barrel in the pipe. It will be apparent that a minimum inside diameter of upset end is maintained for a wireline core barrel recovery.

It will be observed that a drill string composed of pipe as described will have a flush outside diameter and an inside surface of constant diameter interrupted only by a surface of slightly less diameter at the joints merging smoothly into the main surface.

A 3 ½ inch steel drill pipe having the structure described and being heat-treated and annealed upset on the inside at each end for a length of 6 inches has been found to possess greatly increased efficiency over conventional pipe. The inclined shoulders at the top and bottom of the thread eliminated bulging at high torque. The joint mechanical efficiency was 90 percent to 94 percent of pipe strength (90,000 psi). The joint pressure efficiency with an expandable pressure seal or gasket of "TEFLON" (trade mark), was 94 percent of pipe body burst (10,000 psi).

I claim:

1. A drill pipe having an internally upset enlarged joint section at each end thereof, each of said sections having a threaded portion of tapering diameter and an annular shoulder at each end of said threaded portion, each said shoulder having an axially presented face disposed at an angle of approximately 30° to a plane normal to the axis of the pipe, the threaded surface of one of said sections being on the inside of said pipe and the threaded surface of the other of said sections being on the outside of said pipe, said outside threaded joint section being of substantially less maximum diameter than the outside diameter of the remaining portion of said pipe, said outside diameter of said pipe being constant from end to end thereof, each said upset joint section having an inside wall surface parallel to the outer surface of said pipe and merging into the inside wall surface of the remaining section of said pipe in a curved contour, said inside wall surfaces being axially aligned and having equal diameters which have less than the minimum diameter of each of said threaded portions, said remaining section of said pipe having a constant diameter said inside-threaded joint section having an inside annular seal-receiving groove disposed between the inner of said shoulders and the threaded portion thereof.

* * * * *